United States Patent [19]
Hanada et al.

[11] Patent Number: 5,904,974
[45] Date of Patent: May 18, 1999

[54] PVA-BASE THERMOPLASTIC COPOLYMER AND ITS PRODUCTION PROCESS AND USE

[75] Inventors: Kazuyuki Hanada; Katsumi Kuriyama, both of Tokyo, Japan

[73] Assignees: Dainichiseika Color & Chemicals Mfg. Co., Ltd; Ukima Colour & Chemicals Mfg. Co., Ltd, both of Tokyo, Japan

[21] Appl. No.: 08/882,151

[22] Filed: Jun. 25, 1997

Related U.S. Application Data

[62] Division of application No. 08/706,783, Sep. 3, 1996, abandoned.

[30] Foreign Application Priority Data

Aug. 31, 1995 [JP] Japan ................................. 7-245140

[51] Int. Cl.$^6$ .......................... C09D 129/04; C08L 29/04
[52] U.S. Cl. .......................... 428/207; 428/480; 428/481; 428/483; 428/511; 428/514; 428/520; 428/36.6; 525/58; 525/61
[58] Field of Search .................... 525/58, 61; 428/36.6, 428/511, 514, 520, 207, 480, 481, 483

[56] References Cited

U.S. PATENT DOCUMENTS

| | | | |
|---|---|---|---|
| 3,859,125 | 1/1975 | Miller | 428/511 |
| 4,284,671 | 8/1981 | Cancio | 525/58 |
| 4,372,986 | 2/1983 | Imada | 428/520 |
| 4,376,153 | 3/1983 | Cardy | 525/61 |
| 5,612,412 | 3/1997 | Watanabe | 525/58 |

*Primary Examiner*—David Buttner
*Attorney, Agent, or Firm*—Oblon, Spivak, McClelland, Maier & Neustadt, P.C.

[57] ABSTRACT

A PVA-base copolymer is obtained by subjecting a lactone, whose ring is formed of 3 to 10 carbon atoms, to ring-opening polymerization in the presence of polyvinyl alcohol (PVA). The copolymer comprises a PVA chain and an aliphatic polyester grafted as a ring-opened polymer of the lactone on the PVA chain. Further, the copolymer has a PVA content of 2 to 98 wt. %, a polyester content of 98 to 2 wt. %, and a number average molecular weight of 10,000 to 500,000.

10 Claims, No Drawings

PVA-BASE THERMOPLASTIC COPOLYMER AND ITS PRODUCTION PROCESS AND USE

This is a Division of application Ser. No. 08/706,783 filed on Sep. 3, 1996, now abandoned.

BACKGROUND OF THE INVENTION a) Field of the Invention

This invention relates to a novel PVA-base copolymer and also to its production process and use. More specifically, the present invention is concerned with a novel PVA-base copolymer comprising a PVA chain and an aliphatic polyester grafted as a ring-opened polymer (aliphatic polyester) of said lactone on said PVA chain and useful as films having high flexibility and excellent waterproofness, formability, gas barrier properties and safety, hot-melt adhesives, release treatments, various coating materials suited for molded or otherwise formed products of vinyl chloride resins and ink jet recording sheets, binders for paints, inks and the like, packaging materials, forming materials and the like; and also with its production process and use.

b) Description of the Related Art

PVA has excellent properties such as water solubility, solvent resistance, adhesiveness, film formability, gas barrier properties and safety and has conventionally been used in a wide variety of fields as forming materials for fibers, paper, adhesives and films.

For its water solubility, PVA is however poor in waterproofness. Further, PVA coatings lack flexibility although they are strong and tough. To overcome this problem, PVA coatings are used by imparting flexibility thereto with water or an alcoholic plasticizer. These coatings are however accompanied by the drawback that they have high humidity-dependency and cannot exhibit stable performance.

In addition, PVA undergoes gradual thermal decomposition when heated to temperatures of 100° C. or higher in air. For its high softening point, it has heretofore been unable to obtain films, sheets or like formed products from PVA by any process other than the solution process (dissolution process) when PVA is used in a water-free or unplasticized form.

To improve the formability of PVA, PVA is converted into derivatives such as polyvinyl formals and polyvinyl butyral by chemical reactions, and these derivatives are then used as materials for various films, sheets and other formed products.

The modification into such a formal or butyral form, however, unavoidably leads to reductions in properties inherent to PVA, such as water solubility, gas barrier properties and biodegradability.

As a method for imparting flexibility to PVA without relying upon such a chemical modification, there is a method that plasticizes PVA with a plasticizer such as glycerin. However, the plasticizer incorporated in PVA is extracted out with a solvent or bleeds out to a surface of a formed product along the passage of time. Further, because the plasticizer is caused to evaporate significantly upon its melt forming, PVA obtained by this method involves the problem that this evaporation of plasticizer may deteriorate the quality and workability of the resulting formed product and may also contaminate the working environment or the like.

With a view to overcoming the above-mentioned problems of a plasticizer in PVA, a variety of investigations have been conducted. For example, Japanese Patent Application Laid-Open (Kokai) No. SHO 51-123257 discloses use of an esterified product between a polyhydric alcohol and a polycarboxylic acid as a plasticizer, and Japanese Patent Application Laid-Open (Kokai) No. SHO 49-120946 discloses use of an esterified product between glycerin and phthalic acid as a plasticizer. The use of these plasticizers, however, has not brought about any satisfactory results yet.

Also reflecting the environmental problems and the like in recent years, there is an outstanding desire for the development of a high-molecular material which has water solubility and safety and enables direct manufacture of sheets, films and various other formed products by various forming machines without using the dissolution process or a plasticizer.

SUMMARY OF THE INVENTION

An object of the present invention is therefore to provide a novel PVA-base copolymer which has been improved in the above-described drawbacks of PVA, has high flexibility and excellent waterproofness, formability, gas barrier properties and safety, and is useful as films having high flexibility and excellent waterproofness, formability, gas barrier properties and safety, hot-melt adhesives, release treatments, various coating materials suited for molded or otherwise formed products of vinyl chloride resins and ink jet recording sheets, binders for paints, inks and the like, packaging materials, forming materials and the like; and also to provide its production process and use.

The above object can be attained by the present invention which will be described hereinafter. Namely, the present invention provides a PVA-base copolymer obtained by subjecting a lactone, whose ring is formed of 3 to 10 carbon atoms, to ring-opening polymerization in the presence of polyvinyl alcohol (PVA), said copolymer comprising a PVA chain and an aliphatic polyester grafted as a ring-opened polymer of said lactone on said PVA chain, and said copolymer having a PVA content of 2 to 98 wt. %, a polyester content of 98 to 2 wt. % and a number average molecular weight of 10,000 to 500,000; and also its production process and use.

According to the present invention, the novel PVA-base copolymer with an aliphatic polyester grafted on PVA is provided. This PVA-base copolymer is useful *inter alia* as films having high flexibility and excellent waterproofness, formability, gas barrier properties and safety, packaging materials, forming materials, various coating materials, and binders for paints and inks.

Further, a gas barrier composition according to the present invention provides coatings which are excellent not only in gas barrier properties but also in formability, strength and flexibility. A gas barrier material according to the present invention, which is equipped with such a coating, can be used as a packaging material for foods, pharmaceuticals, cosmetics and daily necessities for various applications where gas barrier properties are required.

The gas barrier composition according to the present invention does not give off toxic gas or harmful substances even when it is disposed through incineration. Its disposal as a waste is hence easy. It also has high productivity so that it can be produced at low cost.

The PVA-base copolymer available from the present invention is useful as a hot-melt adhesive, because it is low in melt viscosity and softening point and is excellent in softness and flexibility.

A release treatment according to the present invention features improved adhesion to a base material and improved flexibility and solubility. It therefore provides excellent workability and also shows superb releasing or parting performance at room temperature and even under the conditions of 50° C.

Further, the present invention also provides a coating composition, which can prevent bleeding-out of a plasticizer, which is contained in a plasticized vinyl chloride resin, so that a molded or otherwise formed product of the resin can be protected from surface smear; and the molded or otherwise formed resin product coated with the coating composition.

In addition, use of the copolymer, which is composed of PVA and an aliphatic polyester grafted on the PVA, as a resin component for the formation of an ink-receiving layer in accordance with the present invention provides an ink jet recording sheet, which is excellent in the absorption and color development of an ink, can yield printed images of stable high-quality, and is excellent in the waterproofness and humidity resistance of the ink-receiving layer and printed image.

DETAILED DESCRIPTION OF THE PREFERRED EMBODIMENTS

The present invention will hereinafter be described more specifically through its preferred embodiments.

The PVA-base copolymer according to the present invention, in which an aliphatic polyester is grafted on a PVA chain, can be obtained by subjecting a lactone to ring-opening polymerization in the presence of PVA.

Preferred as the PVA for use in the present invention is a PVA whose vinyl acetate units has a saponification degree of 60 mole % or higher. The preferred average polymerization degree of the PVA may range from 20 to 20,000, with a range of 200 to 3,000 being more preferred.

No particular limitation is imposed on the lactone which is reacted with the PVA in the present invention, insofar as the number of carbon atoms making up a ring which forms an aliphatic polyester upon ring-opening polymerization is 3 to 10.

If such a lactone does not contain any substituent group, it can be represented by the following formula:

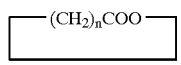

wherein n is an integer of 2 to 9.

Further, any carbon atom or atoms in the alkylene chain —$(CH_2)_n$— in the above formula may each contain at least one substituent group such as a lower alkyl or lower alkoxyl group having about 1 to 8 carbon atoms, a cycloalkyl group, a phenyl group or an aralkyl group.

Illustrative of the lactone usable in the present invention are β-lactones such as β-propiolactone and dimethylpropyllactone; γ-lactones such as butyrolactone, γ-valerolactone and γ-caprolactone; δ-lactones such as δ-valerolactone and δ-caprolactone; and ε-lactones such as ε-caprolactone. Preferred lactones are δ-lactone and ε-lactone.

Particularly preferred examples of the δ-lactones include δ-valerolactones such as 5-valerolactone, 3-methyl-5-valerolactone, 3,3-dimethyl-5-valerolactone, 2-methyl-5-valerolactone and 3-ethyl-5-valerolactone.

Particularly preferred examples of the ε-lactones include ε-caprolactones, for example, ε-caprolactone; monoalkyl-ε-caprolactones such as monomethyl-ε-caprolactone, monoethyl-ε-caprolactone, monodecyl-ε-caprolactone and monopropyl-ε-caprolactone; dialkyl-ε-caprolactones with two alkyl groups substituted to carbon atoms at positions other than the ε position, respectively; trialkyl-ε-caprolatones with three alkyl groups substituted to carbon atoms at positions other than the ε position, respectively; alkoxy-ε-caprolactones such as ethoxy-ε-caprolactone; cycloalkyl-ε-caprolactones such as cyclohexyl-ε-caprolactone; aralkyl-ε-caprolactones such as benzyl-ε-caprolactone; and aryl-ε-caprolactones such as phenyl-ε-caprolactone.

In the present invention, these lactones can be used either singly or in combination.

Although the grafting reaction of the aliphatic polyester to the PVA can be conducted by subjecting the above-described lactone to ring-opening polymerization in an emulsified dispersion of the PVA or a solution of the PVA in a suitable solvent, it is preferred to react the PVA in a powder form with the lactone in a liquid form under a nitrogen gas stream by using a known ring-opening polymerization catalyst such as tetrabutyl titanate because PVA undergoes thermal decomposition when heated in air. The reaction between the PVA and the lactone can be performed under stirring in a usual reaction vessel or while melting them in a single-screw or twin-screw extruder or in a mixer such as a Banbury mixer, kneader or Brabender mixer. This reaction is generally conducted at 80 to 220° C. for several hours.

When the PVA and the lactone are reacted in a usual reaction vessel, the while powdery PVA and the liquid lactone are in a non-homogeneous mixed form in the beginning of the reaction but, as the reaction goes on, they are brought into a homogeneous mixed form so that a homogeneous reaction product is obtained eventually.

By changing the amount and molecular weight of the aliphatic polyester, which is to be grafted on the PVA, in various ways, a variety of PVA-base copolymers according to the present invention can be obtained with properties inherited from both the PVA and the aliphatic polyesters. The PVA and the aliphatic polyester, which make up the copolymer according to the present invention, are both high-safety polymers.

The proportions of the PVA and the aliphatic polyester in the PVA-base copolymer according to the present invention, in which the latter polymer is grafted on the former polymer, are 2 to 98 wt. % for the PVA and 98 to 2 wt. % for the aliphatic polyester. Optimal proportions can be determined in accordance with properties to be required.

For example, a copolymer composed of 60 to 98 wt. % of the PVA and 40 to 2 wt. % of the aliphatic polyester can exhibit the properties of the PVA such as solvent resistance, high strength, abrasion resistance and gas barrier properties.

On the other hand, a copolymer composed, for example, of 2 to 59 wt. % of the PVA and 98 to 41 wt. % of the aliphatic polyester can show the properties of the aliphatic polyester such as softness, flexural resistance, waterproofness and adhesiveness.

The molecular weight of the above-described PVA-base copolymer according to the present invention has a number average molecular weight as measured by GPC of 10,000 to 500,000 (calibrated with standard polystyrene). A molecular weight lower than 10,000 leads to a PVA-base copolymer inferior in strength characteristics, while a molecular weight higher than 500,000 results in a PVA-copolymer with deteriorated formability. The preferred molecular weight ranges from 10,000 to 150,000.

A formed product made of the PVA-base copolymer according to the present invention is excellent in flexibility, waterproofness, solvent resistance, gas barrier properties, strength and the like even in a uncrosslinked form. The above-mentioned properties of the formed product of the PVA-base copolymer can be improved further by crosslinking the PVA-base copolymer with one of various crosslinking agent at the time of forming while making use of hydroxyl groups still remaining in the copolymer. Any crosslinking agent can be used for the crosslinking insofar as it reacts with hydroxyl groups. Preferred illustrative examples include phenol resins, melamine resins, epoxy resins and polyisocyanates.

The PVA-base copolymer according to the present invention can be formed into sheets, films and other formed products by an extruder, injection molding machine or the like. It can also be used as a coating material for molded or otherwise formed products by dissolving it in one of various solvents or vehicles or as a binder for paints or inks.

A description will next be made about certain applications of the PVA-base copolymer according to the present invention.

(1) Gas barrier compositions and gas barrier materials

The PVA-base copolymer according to the present invention is useful as a gas barrier composition or a gas barrier material which is suited for use upon production of packaging materials for foods, pharmaceuticals, cosmetics and daily necessities.

Polyvinylidene chloride resin (PVDC), PVA, ethylene-vinyl alcohol (EVOH) and the like have been known as typical examples of gas barrier high-molecular materials for forming coatings on surfaces of plastic base materials to impart gas barrier properties to the plastic base materials.

However, PVDC is a chlorinated resin so that it involves problems from the standpoint of waste disposal compatible with the environment such as its disposal through incineration after use or its recycling for reuse.

Further, the melting point and thermal decomposition temperature of PVA are extremely close to each other so that it cannot be formed by melt extrusion or the like. Moreover, it is accompanied with the problem that its coating loses flexibility and becomes brittle and prone to breakage under low-humidity conditions although the coating remains flexible and tough under high-humidity conditions.

On the other hand, EVOH can be formed by melt extrusion or the like but is more costly than PVA. In addition, EVOH involves problems such that under low-humidity conditions, an EVOH film is inferior in gas barrier properties and flexibility to a PVA film and may be whitened or rendered susceptible to cracking by bending. The PVA-base copolymer according to the present invention is a material which has resolved such problems.

In the PVA-base copolymer of the present invention which is preferred as a gas barrier composition or a gas barrier material, the preferred proportions of the respective polymers are 50 to 90 wt. % for the PVA and 50 to 10 wt. % for the aliphatic polyester.

The copolymer can exhibit both the solvent resistance, high strength, high abrasion resistance and gas barrier properties of the PVA and the flexibility, flexural resistance, waterproofness and adhesiveness of the aliphatic polyester.

However, a PVA-base copolymer in which the proportion of the PVA is greater than 90 wt. % and that of the aliphatic polyester is smaller than 10 wt. % is insufficient in flexibility, flexural resistance, waterproofness and adhesiveness although it can form films having excellent gas barrier properties. On the other hand, a PVA-base copolymer in which the proportion of the PVA is smaller than 50 wt. % and that of the aliphatic polyester is greater than 50 wt. % is insufficient in gas barrier properties, solvent resistance and the strength of a coating although it can form films having superb adhesiveness, flexibility, flexural resistance and waterproofness. More preferred proportions are 60 to 80 wt. % for the PVA and 40 to 20 wt. % for the aliphatic polyester.

The gas barrier composition according to the present invention can be added with additives, as needed, in addition to the PVA-base copolymer of the present invention as an essential component. Illustrative of the additives are color pigments, extender pigments, ultraviolet light absorbers, ultraviolet light stabilizers, colloidal silica, dispersants, anti-mold agents and matting agents.

No particular limitation is imposed on the gas barrier composition according to the present invention, so that it can be, for example, in the form of a solution or a solid.

The gas barrier material according to the present invention comprises a plastic base material and a coating of the above-described gas barrier composition formed on at least one side of plastic base material.

As the plastic base material employed in the present invention, plastic base materials which have been used as packaging materials to date are all usable. Usable examples include polyolefins such as polyethylene polypropylene and polystyrene; polyesters such as polyethylene terephthalate, polybutylene terephthalate and polyethylene naphthalate; polyamides such as nylon-6 and nylon-66; polyimides; and copolymers thereof.

These high-molecular materials can contain additives as needed, including publicly-known antistatic agents, ultraviolet light absorbers, plasticizers, lubricants and coloring agents.

A description will next be made of a process for forming a coating on a surface of a plastic base material by using the gas barrier composition according to the present invention. When the gas barrier composition according to the present invention is, for example, in the form of a solid, the composition is directly melt-formed into a film or sheet, followed by its lamination on the plastic base material.

The lamination can be performed, for example, by a dry or sand lamination method in which lamination is conducted via a dry laminating adhesive of the urethane, acrylic or like type, or by a co-extrusion lamination method in which the plastic base material and the PVA-base copolymer according to the present invention are subjected, for example, to co-extrusion or co-injection.

When the gas barrier composition according to the present invention is in the form of a solution, it is possible to use a solution coat forming method in which the gas barrier composition according to the present invention in the form of the solution is coated onto a surface of the plastic base material, for example, by a gravure coater, knife coater, reverse coater or bar coater or by dipping, brushing, air spray or airless spray.

When the gas barrier composition according to the present invention is in the form of a solution, the composition can be used as a solution, for example, in a solvent which can dissolve the PVA-base copolymer according to the present invention. Usable examples of the solvent include glycols such as ethylene glycol, glycerin and diethylene glycol; dimethylsulfoxide (DMSO); N,N-dimethylformamide (DMF); and mixed solvents of lower alcohols such as isopropanol and water. For practical use, a mixed solvent of a lower alcohol and water is preferred. No particular limitation is imposed on the concentration of the solution. The concentration may range, for example, from 10 to 50 wt. %.

Although the coating formed of the PVA-base copolymer according to the present invention is excellent in flexibility, waterproofness, solvent resistance, gas barrier properties, strength and the like even in the form as obtained (i.e., in the form that the copolymer has not been crosslinked), it can be converted into a coating improved further in the above-described properties by crosslinking the copolymer with one of various crosslinking agents upon formation of the coating while making use of hydroxyl groups in the copolymer. Any crosslinking agent can be used insofar as it reacts with hydroxyl groups remaining in the PVA-base copolymer. Preferred illustrative crosslinking agents include phenol resins, melamine resins, epoxy resins and polyisocyanates.

The gas barrier material of the present invention obtained as described above can be used as a multi-layer laminate, as needed, by further laminating a heat-sealable thermoplastic resin layer over the gas barrier coating, arranging a printed layer over the gas barrier coating or laminating plural resins over the gas barrier coating via adhesive layers.

The gas barrier material according to the present invention can be processed into a form suited for a packaging material for a food, pharmaceutical, cosmetic, daily necessity or the like by reheating and stretching it on a vacuum molding machine, compression molding machine or stretch blow molding machine or by heating and stretching it on a uniaxial or biaxial stretching machine.

(2) Hot-melt adhesives

The PVA-base copolymer according to the present invention is useful as a hot-melt adhesive. According to the present invention, a hot-melt adhesive low in melt viscosity and softening temperature and excellent in softness, flexibility, waterproofness and the like is furnished.

As a hot-melt adhesive can be applied to various materials, has low toxicity and hazardousness and is advantageous in cost, it has long been used widely for applications such as packaging, wood working, book binding, shoe making, and textile making.

As conventional hot-melt adhesives, ethylene-vinyl acetate copolymer, polyethylene, polyamides, polyesters, PVA and the like have been used in general. They are required to have various properties such as adhesiveness, meltability, heat resistance, cold resistance, softness and flexibility, and waterproofness. Among these hot-melt adhesives, hot-melt adhesives formed of water-soluble PVA are attracting interests recently.

PVA is however a resin high in both softening point and melt viscosity so that it cannot be used by itself as a hot-melt adhesive. Hence, a plasticizer such as glycerin is added to PVA. Even if such a plasticizer is added, it is however still impossible to lower its softening point and melt viscosity to desired values. Under the circumstances, there is hence no choice other than using PVA at a high temperature (150° C. or higher) as a hot-melt adhesive.

Further, since PVA is inferior in low-temperature flexibility, products making use of a PVA-base hot-melt adhesive involve the problem that portions of the hot-melt adhesive become brittle when the temperature is low.

The PVA-base copolymer according to the present invention provides a hot-melt adhesive which has overcome the above-described problems, is low in melt viscosity and softening point and is excellent in softness, flexibility, waterproofness and the like.

Concerning the weight ratio of the PVA to the aliphatic polyester in the PVA-base copolymer useful as a hot-melt adhesive in the present invention, it is preferred to contain the PVA within a range of 70 to 20 parts by weight and the aliphatic polyester within a range of 30 to 80 parts by weight. A PVA-base copolymer in which the proportion of the PVA exceeds 70 parts by weight and that of the aliphatic polyester is less than 30 parts by weight is dominantly governed in properties by the PVA, so that it is insufficient in melt viscosity, softening point, softness, flexibility and the like. On the other hand, a PVA-base copolymer in which the proportion of the PVC is less than 20 parts by weight and that of the aliphatic ester exceeds 80 parts by weight is dominantly governed in properties by the aliphatic polyester, so that its melt viscosity, softening point and the like are unduly low.

The hot-melt adhesive according to the present invention may contain one or more other resins, such as an ethylene-vinyl acetate copolymer, a polyester, polypropylene, a polyamide and/or polyethylene, to extent not impairing the object of the present invention. It is also possible to contain one or more additives, for example, a known additive for hot-melt adhesives, such as a rosin resin, a hydrogenated petroleum resin or a hydrocarbon resin; an antioxidant, a lubricant, a filler, a coloring-agent and/or a stabilizer.

Crosslinking of the PVA-base copolymer according to the present invention with one of various crosslinking agents while making use of hydroxyl groups still remaining in the PVA-base copolymer makes it possible to obtain a hot-melt adhesive excellent in heat resistance, mechanical strength, waterproofness, solvent resistance and the like. Any crosslinking agent is usable insofar as it reacts with hydroxyl groups. Specifically, phenol resins, melamine resins, epoxy resins, isocyanate resins and the like are suited.

The hot-melt adhesive according to the present invention is molten and molded into a desired shape to provide it as a final product. For example, it can be formed into such an appropriate form as that adopted conventionally for hot-melt adhesives, for example, rectangular sheets, biscuits, ropes, films or powder. It can also be formed into a molded or otherwise formed shape such as a bottle, a sheet, a hose, a tube, a container, a bag or fibers.

The thus-obtained hot-melt adhesive according to the present invention has a low melt viscosity and a low softening point, so that is excellent in coating workability and also very good in softness, flexibility, waterproofness and the like.

Compared with products making use of a conventional PVA-base hot-melt adhesive added with a plasticizer or the like, those making use of the hot-melt adhesive according to the present invention undergo less variations along the passage of time and also have superior storage stability.

No particular limitation is imposed on a material to which the hot-melt adhesive according to the present invention is applied. The hot-melt adhesive according to the present invention can be used in manufacture of boxes or cases such as cardboard boxes and cartons, packaging of confectioneries, candies, toys, dolls, games and the like, binding of books such as telephone directories, catalogs and cutforms, wood working for furniture, manufacture of papers such as paper and labels, manufacture of cans such as aluminum cans, construction as decorative papers for aluminum sashes, manufacture of clothing such as leathers and textiles, manufacture of automobiles, manufacture of electric parts, and manufacture of shoes.

(3) Release treatments

The PVA-base copolymer according to the present invention is also useful as a release treatment for providing a back side of a base material of a tape or a surface of a release paper, said back side or said surface being maintained in an overlapped contiguous relationship with a surface of a pressure-sensitive adhesive, with release properties in a product making use of the pressure sensitive adhesive such as a self-adhering tape, a self-adhering adhesive or a self-adhering sheet.

Release treatments, which have heretofore been employed for the above-described purposes, can be roughly divided into silicone-base release agents and non-silicone-base release agents. The silicone-base release agents have excellent release performance for both rubber-base self-adhering adhesives and acrylic self-adhering adhesives.

However, a silicone-base release agent requires heat treatment at an elevated temperature upon its application so that it cannot be used for substrates having low heat resistance such as OPP and polyethylene. Moreover, a silicone-base release agent also involves the problem of silicone compounds of low molecular weights contained as impurities in the releasing agent, and is accompanied by a drawback in writing quality and the like.

On the other hand, the non-silicone-base release agents include polymers of long-chain acrylates, polymers of fluorinated alkylvinyl monomers, PVA, polycarbamates and the like. These release agents are however not satisfactory in release properties and residual adhesiveness.

Further, Japanese Patent Publication (Kokoku) No. SHO 29-2989 discloses a release treatment which comprises a reaction product obtained by reacting stearyl isocyanate with PVA. This PVA-base release treatment shows release effects in an extremely small coat weight, is excellent in performance upon high-speed peeling and is also good in writing quality and heat resistance. It is therefore most widely used as a nonsilicone-base release agent.

A release agent of this type is however poor in adhesion and flexibility and also in solvent solubility. It is therefore accompanied by a problem in workability such that in winter, a solution of the release agent may be gelled or the release agent may deposit or precipitate.

The above-described problems have been overcome by using the PVA-base copolymer of this invention in a release treatment. The present invention therefore provides a release treatment which is excellent in the adhesion to a base material and also in flexibility and exhibits excellent workability owing to improved solubility in solvents.

Namely, the present inventors has proceeded with extensive research to overcome the above-described problems. As a result, it has been found that a reaction product obtained by reacting the PVA-base copolymer according to the present invention with an isocyanate containing an aliphatic group having 12 or more carbon numbers has excellent release performance, is excellent in the adhesion to a base material and also in flexibility and provides improved workability owing to the improved solubility.

Further, particularly good performance is exhibited by a release treatment which comprises a reaction product obtained by reacting an isocyanate having an aliphatic group containing 12 or more carbon atoms with a PVA-base copolymer which has been obtained by grafting a polyester selected from a polycaprolactone or a polyvalerolactone on PVA whose saponification degree is 60 mole % or higher.

The reaction product which is obtained by reacting the isocyanate having the aliphatic group containing 12 or more carbon atoms with the PVA-base polymer according to the present invention is excellent in the adhesion to a base material and also in flexibility and is also superb in the solubility in a solvent compared with a reaction product obtained by reacting the isocyanate having the aliphatic group containing 12 or more carbon atoms with conventional PVA.

More specifically, in the present invention, the PVA is modified by the grafting of the aliphatic polyester on the PVA, thereby making it possible to provide a release treatment substantially improved in adhesion, flexibility and solubility.

Regarding the weight ratio of the PVA to the aliphatic polyester in the PVA-base copolymer of this invention for use in the release treatment, the proportions of the PVA and the aliphatic polyester are preferably in a range of 90 to 60 parts by weight and in a range of 10 to 40 parts by weight, respectively.

A PVA-base copolymer in which the proportion of the PVA exceeds 90 parts by weight and that of the aliphatic polyester is less than 10 part by weight leads to a release treatment which is not very much improved in adhesion, flexibility and solubility because of the properties inherited from the PVA. On the other hand, a PVA-base copolymer in which the proportion of the PVA is less than 60 parts by weight and that of the aliphatic polyester exceeds 40 parts by weight is not suited for the release treatment according to the present invention because of the properties inherited from the aliphatic polyester.

A resin which forms a release treatment according to the present invention can be obtained by reacting the PVA-base copolymer according to the present invention with an isocyanate having an aliphatic group which contains 12 or more carbon atoms.

The isocyanate which contains the aliphatic group and is useful in the present invention can be represented by a formula R-NCO, where R represents a linear aliphatic group containing 12 or more carbon atoms and encompasses an alkyl group and an alkenyl group.

Specific examples of the isocyanates containing the aliphatic group include lauryl isocyanate (carbon number: 12), myristyl isocyanate (carbon number: 14), cetyl isocyanate (carbon number: 16), stearyl isocyanate (carbon number: 18), eicosanyl isocyanate (carbon number 20), docosanyl isocyanate (carbon number 22), tetracosanyl isocyanate (carbon number 24), hexaconyl isocyanate (carbon number: 26), and octacosanyl isocyanate (carbon number: 28).

The isocyanate which contains the aliphatic group can also be a reaction product obtained using a linear alcohol having 12 or more carbon atoms and a diisocyanate at a molar ratio of about 1:1, which contains one free isocyanate group. Like the above-exemplified isocyanates, this reaction product can provide a release treatment according to the present agent.

Examples of the linear alcohol having 12 or more carbon atoms include lauryl alcohol (carbon number: 12), myristyl alcohol (carbon number: 14), cetyl alcohol (carbon number: 16), stearyl alcohol (carbon number: 18), eicosanol (carbon number: 20), docosanol (carbon number: 22), tetracosanol (carbon number: 24), hexacosanol (carbon number: 26), and octacosanol (carbon number: 28). Examples of the diisocyanate which is reacted with the linear alcohol having 12 or more carbon atoms include various diisocyanates available as raw materials for polyurethane resins.

A description will next be made about the reaction between the PVA-base copolymer and the isocyanate which has the aliphatic group containing 12 or more carbon atoms. After the copolymer is dissolved or dispersed in a solvent inert to isocyanate groups, the copolymer is reacted with the isocyanate which has the aliphatic group containing 12 or more carbon atoms.

At this time, it is preferred to react the isocyanate in a range of 0.6 to 1.1 equivalents relative to hydroxyl groups in the PVA-base copolymer. The reaction is terminated when an absorption peak corresponding to isocyanate groups in the reaction mixture becomes no longer detectable. The reaction mixture is poured into 2 to 5 volumes of a poor solvent such as an alcohol so that the reaction product is caused to deposit. The deposit is collected by filtration and then dried, whereby the target product according to the present invention is obtained.

The reaction product which has been obtained as described above shows excellent solubility in solvents such as toluene and xylene, and is excellent in properties such as release properties, residual adhesiveness, the adhesion to a base material, and flexibility.

The release treatment according to the present invention comprises the above-described reaction product and can be applied in the form of a solid or a solution. Upon formation of a release coating with this release treatment, the above reaction product can be crosslinked with one of various crosslinking agent while making use of hydroxyl groups still remaining in the PVA-base copolymer. As a result, the release coating can be provided with excellent heat resistance, mechanical strength, waterproofness, solvent resistance and the like. Any crosslinking agent is usable, insofar as it reacts with hydroxyl groups. Specific appropriate examples include phenol resins, melamine resins, epoxy resins and isocyanate resins.

The release treatment according to the present invention is coated to base materials such as plastic films, sheets or tapes to give a solid coat weight of 0.01 to 1.0 $g/m^2$, preferably 0.05 to 0.5 $g/m^2$. The thus-coated films, sheets or tapes can be used as products such as release films, sheets or tapes. They can be used in products such as self-adhering tapes, self-adhering labels and self-adhering sheets which make use of a rubber-base, acrylic or hot-melt self-adhering agent or pressure-sensitive adhesive.

(4) Coating compositions for molded or otherwise formed products of plasticized vinyl chloride resins, and molded or otherwise formed products of plasticized vinyl chloride resins coated by the coating compositions.

The PVA-base copolymer according to the present invention is also useful as a film-forming component in a coating composition for a molded or otherwise formed product of a plasticized vinyl chloride resin. The coating composition can prevent the plasticizer in the molded or otherwise formed product of the plasticized vinyl chloride resin from bleeding out (moving to a surface), thereby protecting the surface of the molded or otherwise formed product from smear. The coating composition is excellent in weatherability, softness, waterproofness, solvent resistance, adhesiveness and the like.

Vinyl chloride resin is economical and has excellent chemical stability. By changing the amount of a plasticizer, vinyl chloride resin can be used with a wide range of hardness, that is, as resins ranging from hard resin to soft resin. Vinyl chloride resin is therefore used widely in many applications including interior finishing materials such as wall papers, flooring materials and ceiling materials, sheets such as agricultural sheets, tents and sails, and molded or otherwise formed products such as desk mats, hoses and tubes.

However, a plasticized vinyl chloride resin contains a plasticizer at a high concentration, and is hence accompanied by the drawback that the plasticizer bleeds out to a surface of a molded or otherwise formed product along the passage of time and may cause smear or blocking of the molded or otherwise formed product.

A variety of methods have been studied to date for the prevention of bleed-out of a plasticizer from a plasticized vinyl chloride resin.

For example, it is proposed in Japanese Patent Publication (Kokoku) No. SHO 47-28740 to prevent a plasticizer from moving to a surface of a molded or otherwise formed product of a plasticized vinyl chloride resin by applying a resin coating layer to a surface of the molded or otherwise formed product. As resins for forming such coating layers, homopolymers, copolymers and the like of acrylate esters or methacrylate esters are known. It is however impossible to sufficiently prevent movement of plasticizers by coatings of these polymers. Further, such coatings are not satisfactory in the above-mentioned various properties such as anti-smear property, anti-blocking property and flexural resistance.

Further, Japanese Patent Application Laid-Open (Kokai) No. HEI 2-299838 discloses, as a coating material to be formed on a surface of a sheet of a plasticized vinyl chloride resin, a sheet made primarily of a fluorine-containing copolymer or acrylic copolymer containing cross-linked sites and having excellent adhesion to the plasticized vinyl chloride resin. This sheet however cannot sufficiently prevent bleed-out of such a plasticizer.

According to the present invention, use of the PVA-base copolymer of this invention can provide a coating composition for preventing bleed-out of a plasticizer from a molded or otherwise formed product of a plasticized vinyl chloride resin and also the molded or otherwise formed product made of the plasticized vinyl chloride resin and coated with the composition.

For the prevention of bleed-out of a plasticizer, the present inventors were interested in PVA which is excellent in solvent resistance, the strength of a coating, abrasion resistance and gas barrier properties. PVA is a preferred material from the standpoint of prevention of bleed-out of a plasticizer. It however undergoes cracking or whitening when bent, because it is poor in softness and flexibility. For its water solubility, it is also inferior in anti-blocking property, anti-smear property and the like under high-humidity conditions. Accordingly, PVA was not satisfactory.

Incidentally, ester-base plasticizers and polyester-base resins have been used for many years to plasticize vinyl chloride resins. It is evident that their ester bonds contribute to the plasticization of the vinyl chloride resins and also to their miscibility with the vinyl chloride resins.

The present inventors therefore conducted an extensive study with a view to overcoming the above-described problems associated with the plasticizers for PVA. As a result, it has been found that the PVA-base copolymer according to the present invention can prevent bleed-out of a plasticizer from a plasticized vinyl chloride resin, is excellent in softness, flexibility, waterproofness, solvent resistance and weatherability and is superb in the adhesion with the plasticized vinyl chloride resin.

The PVA-base copolymer of this invention, which is useful for the above-described application, is a copolymer composed of 50 to 90 wt. % of PVA and 50 to 10 wt. % of an aliphatic polyester.

This copolymer exhibits not only the solvent resistance, high strength, abrasion resistance and gas barrier properties (i.e., properties capable of preventing bleed-out of a plasticizer) of the PVA but also the softness, flexibility, flexural resistance, waterproofness and adhesiveness of the aliphatic polyester.

However, a PVA-base copolymer in which the proportion of the PVA exceeds 90 wt. % and that of the aliphatic polyester is less than 10 wt. % is insufficient in the adhesion to a molded or otherwise formed product of a plasticized vinyl chloride resin, softness, flexibility, flexural resistance and waterproofness although it has excellent properties for preventing bleed-out of a plasticizer. On the other hand, a PVA-base copolymer in which the proportion of the PVA is less than 50 wt. % and that of the aliphatic polyester exceeds 50 10 wt. % is insufficient in the properties for preventing of bleed-out of a plasticizer, solvent resistance, the strength of a coating, and the like although it is excellent in the adhesion to a molded or otherwise formed product of a plasticized vinyl chloride resin, softness, flexibility, flexural resistance and waterproofness. The preferred proportions of the PVA and the aliphatic polyester in the PVA-base copolymer employed in this invention are 60 to 80 wt. % and 40 to 20 wt. %, respectively.

The coating composition according to the present invention for the plasticized vinyl chloride resin contains the above-described PVA-base copolymer as a film-forming component. Although the copolymer can by itself (i.e., in an uncrosslinked form) form a coating excellent in softness, flexibility, waterproofness, solvent resistance, the properties for preventing bleed-out of a plasticizer, strength properties and the like, a coating further improved in the above-described properties can be formed by crosslinking the PVA-base copolymer with one of various crosslinking agents at the time of formation of the coating while making use of hydroxyl groups still remaining in the copolymer. Although any crosslinking agent can be used insofar as it reacts with hydroxyl groups, phenol resins, melamine resins, epoxy resins, polyisocyanates and the like are preferred.

The coating composition of the present invention for the plasticized vinyl chloride resin can be added with various additives as needed in addition to the above-described PVA copolymer as an essential component. Illustrative of such additives are color pigments, extender pigments, ultraviolet light absorbers, ultraviolet light stabilizers, colloidal silica, dispersants, anti-mold agents and matting agents.

No particular limitation is imposed on the form of the coating composition according to the present invention. It can be, for example, in the form of a solution of a solid. When the coating composition is in the form of a solution, the coating composition is used as a solution in a solvent which dissolves the PVA-base copolymer. Usable examples of the solvent include glycols such as ethylene glycol, glycerin and diethylene glycol; dimethylsulfoxide (DMSO); N,N-dimethylformamide (DMF); and mixed solvents of lower alcohols such as isopropanol and water. For practical use, a mixed solvent of a lower alcohol and water is preferred. No particular limitation is imposed on the concentration of the solution. The concentration may range, for example, from 10 to 50 wt. %.

A description will next be made of a method for forming a coating on a surface of a molded or otherwise formed product of a plasticized vinyl chloride resin by using the coating composition of the present invention. When the coating composition is in the form of a solution, it can be coated, for example, by a gravure coater, knife coater, reverse coater or bar coater or by dipping, brushing, air spray or airless spray.

When the coating composition of the present invention is in the form of a solid, it is directly molten and formed into a film or sheet, followed by its lamination onto the molded or otherwise formed product of the plasticized vinyl chloride resin. Upon lamination, the film or sheet can be directly laminated under heat or can be laminated via one of various adhesives.

Illustrative of the molded or otherwise formed product which is made of the plasticized vinyl chloride resin and coated with the coating composition of the present invention are wall papers, flooring materials, ceiling materials, leathers, films, hoses, tubes and the like.

(5) Ink jet recording sheets

The PVA-base copolymer according to the present invention is also useful for the production of an ink jet recording sheet provided with an ink-receiving layer which is excellent in the absorption of a water-based ink, yields printed images of stable high-quality, and is excellent in waterproofness and humidity resistance.

Ink jet recording performs recording of images, letters and/or the like by causing an ink to fly and stick in the form of minute droplets on a recording sheet such as a paper sheet in accordance with one of various operation principles, for example, the electrostatic attraction method, the method that mechanical vibrations or displacements are applied to an ink by using piezoelectric elements or the method that an ink is heated and foamed and its pressure is then used. As a recording method which does not produce much noise and enables high-speed printing, high-quality printing and multicolor printing, ink jet recording is finding increasing utility in a wide variety of applications.

Recording sheets proposed for use in such ink jet recording include inter alia recording sheets which are each provided on a base material such as a paper sheet with an ink-receiving layer formed of various pigments and a resin as principal components to make absorption of an ink faster for the formation of well-defined ink dots; and also recording sheets with a porous pigment incorporated therein upon their production. Such ink-receiving layer and porous pigment are used to prevent an ink from bleeding or flowing and hence deteriorating the quality of prints subsequent to the deposition of the ink on the recording sheets.

For example, Japanese Patent Application Laid-Open (Kokai) No. SHO 57-82085 discloses the arrangement of an ink-receiving layer formed of a water-soluble high-molecular substance and making use of an inorganic pigment and an organic pigment as pigments, and Japanese Patent Application Laid-Open (Kokai) No. SHO 62-268682 discloses the inclusion of an ink-receiving layer composed of fine silica powder and a silanol-containing PVA copolymer.

However, keeping step with improvements in the performance and enlargement of application fields of ink jet recording systems such as the move toward higher printing speed, higher resolution and full-color printing, there is an increasing demand for ink jet recording sheets to be equipped with the following high-level characteristics in combination:

(1) High ink-absorbing speed and large ink-absorbing space.

(2) High ability to develop the color of an ink.

(3) High surface strength of an ink-receiving layer.

(4) Waterproofness of a base material so that the base material does not develop unsmoothness or curling by an ink.

(5) Good image storability, such as waterproofness and ozone resistance, of the ink-receiving layer after printing of images thereon.

(6) No time-dependent variations of the ink-receiving layer.

To meet these requirements, it has conventionally been practiced or studied to use a porous pigment or water-soluble high-molecular substance excellent in ink absorption as a component of an ink-receiving layer arranged on an ink jet recording sheet, to use a waterproof polymer latex for improving the waterproofness of an ink-receiving layer, or to employ synthetic paper, plastics or the like having waterproofness as a base material itself.

However, recording sheets making use of paper as a base material or a water-soluble high-molecular substance alone as an ink-receiving layer are poor in waterproofness so that printed areas develop ink bleeding and are hence inferior in vividness. On the other hand, recording sheets making use of synthetic paper or a plastic film as a base material or a waterproof polymer latex as a resin of an ink-receiving layer involve problems in the adhesion between the ink-receiving layer and the base material, the absorption and drying ability of the ink, and the like.

The above-described problems can be overcome by using the PVA-base copolymer of the present invention. According to the present invention, there is hence provided an ink jet recording sheet provided with an ink-receiving layer which is excellent especially in the absorption of a water-based ink, permits formation of well-defined ink dots, is excellent in the development of the color of the ink, yields printed images of stable high-quality, and is also excellent in waterproofness and humidity resistance.

In general, the resolution of an image printed on an ink jet recording sheet is dependent on an absorbed amount of an ink. Unduly high ink absorbency leads to a printed image which is lower in density, is reduced in vividness and color development and is inferior in resolution.

On the other hand, unduly low ink absorbency leads to a printed image of high density, but is accompanied by the drawbacks that the resulting printed image has low quality due to density irregularity and bleeding and requires a longer time for drying the ink.

The present inventors conducted various investigations to overcome the above-described problems of the conventional ink jet recording sheets. As a result, it has been found that formation of an ink-receiving layer with the PVA-base copolymer of the present invention provides an ink jet recording sheet having an ink-receiving layer which has excellent absorbency of a water-based ink, permits formation of well-defined ink dots, has excellent color developing property for the ink, yields printed images of stable high-quality and is excellent in waterproofness and humidity resistance.

An ink jet recording sheet according to the present invention features that at least one ink-receiving layer is arranged on at least one side of a base sheet and the ink-receiving layer comprises the PVA-base copolymer according to the present invention as a resin component.

The PVA-base copolymer of this invention useful for the construction of the ink jet recording sheet is a resin which is composed of 95 to 30 wt. %, preferably 80 to 40 wt. % of the PVC and 5 to 70 wt. %, preferably 20 to 60 wt. % of the aliphatic polyester.

It is therefore possible to control the water absorbency of the ink-receiving layer to an optimal level by using a resin, which has been formed by graft-copolymerizing a hydrophobic aliphatic polyester on the PVA as a water-soluble high molecular substance of the highest hydrophilicity, as a resin component for forming an ink-receiving layer in an ink jet recording sheet.

In other words, it is possible to improve the adhesion with the base material sheet, softness, flexibility, waterproofness and humidity resistance by the aliphatic polyester without impairing the surface strength and water-absorbing properties of the PVA, so that an excellent ink-receiving layer can be obtained.

As the base material in the ink jet recording sheet according to the present invention, paper, a plastic film, or glass can be used. Examples of the paper include high-quality or wood-free paper, medium-quality paper, coated paper, and cast-coated paper. Examples of the plastic film include polyester, polyamide, cellulose triacetate, polycarbonate, polyvinyl chloride, polyethylene, polypropylene, polystyrene and polymethyl methacrylate sheets of 50 to 250 $\mu$m in thickness.

Further, the ink jet recording sheet can also be provided with a primer layer for imparting adhesion to the base material, with an anti-curling layer on a back side, that is, on a side of a non-receiving layer, or with a lubricant layer for improving the coefficient of friction, as needed.

As the resin component making up the ink-receiving layer, the PVA-base copolymer according to the present invention may be used singly. As an alternative, depending on the composition of an ink for jet ink printing, the PVA-base copolymer according to the present invention may also be used in combination with a water-soluble high-molecular substance to impart further hydrophilicity and/or water-absorbing properties or to adjust the hydrophilicity and/or water-absorbing properties.

Illustrative of the water-soluble high-molecular substance are PVA, modified PVA, hydroethylcellulose, CMC, cellulose derivatives, polyvinylpyrrolidone, starch, cationic starch, gelatin, casein, and acrylic polymers.

As a further alternative, the PVA-base copolymer according to the present invention may also be used in combination with a hydrophobic high-molecular substance to impart further waterproofness or durability to the ink-receiving layer or printed images.

Examples of the hydrophobic high-molecular substance include commonly used synthetic resins such as polyester resins, polyvinyl chloride resin, polystyrene resin, polymethyl methacrylate resin, polycarbonate resins, polyurethane resins, vinyl chloride-vinyl acetate copolymers, acrylonitrile-styrene copolymers, polyvinyl butyral resins, polyamide resins, epoxy resins, urea resin, and melamine resins.

Further, to improve the ink absorbency, fixation and color development and further the blocking tendency and waterproofness of the ink-receiving layer, it is also possible to use inorganic and/or organic pigments and resin particles by adding them to the ink-receiving layer.

Usable examples of the pigments and resin particles include known pigments and resin particles, for example, fine particles, fine porous particles and hollow particles of mineral pigments or porous pigments such as kaolin, delaminated kaolin, aluminum hydroxide, silica, diatomaceous earth, calcium carbonate, talc, titanium oxide, calcium sulfate, barium sulfate, zinc oxide, alumina, calcium silicate, magnesium silicate, colloidal silica, zeolite, bentonite, sericite and lithopone, polystyrene resin, urea resin, acrylic resins, melamine resins, benzoguanamine resin, polyurethane resins, and organic pigments. One or more of these pigments and resin particles are used as desired, depending on the quality design of the ink jet recording sheet.

In this case, these pigment and resin particles are added in a range of 0 to 95 wt. %, preferably 10 to 90 wt. % based on the whole solid of the resin composition which makes up the ink-receiving layer.

Besides such resin and pigment particles, the ink-receiving layer can also be added, as needed, with one or more of various aids such as thickeners, parting agents, penetrants, wetting agents, thermal gelling agents, sizing agents, defoaming agents, antifoaming agents, foaming agents, coloring agents, fluorescent whitening agents, ultraviolet light absorbers, antioxidants, quenchers, antiseptic agents, antistatic agents, crosslinking agents, dispersants, lubricants, plasticizers, pH regulators, flow improvers, solidification promoters, and waterproofing agents.

To form an ink-receiving layer on a base material, the PVA-base copolymer according to the present invention is dissolved by itself or together with another resin in one of various organic solvents or water. The resulting solution is added with the above-described pigment or resin particles and various aids to prepare a coating formulation. The coating formulation is then applied by a coating method such as gravure coating, direct or reverse roll coating, wire bar coating, air knife coating, curtain coating, blade coating, rod coating or die coating. After the coating, the thus-coated material is finished using a calender such as a machine calender, a super calender or a soft calender.

The amount of the PVA-base copolymer to be used is preferably from 0.5 to 50 g/m², more preferably from 3 to 20 g/m² or so in terms of a dry weight. An amount smaller than 0.5 g/m² cannot provide sufficient ink absorbency, while an amount greater than 50 g/m² cannot bring about additional effects and is hence uneconomical and moreover, tends to result in a recording sheet which is more susceptible to folding, cracking, curling or the like. It is therefore not preferred to use the PVA-base copolymer in any amount outside the above range.

The present invention will next be described specifically by the following Examples, Production Examples and Comparative Examples, in which all designations of "part" or "parts" and "%" mean "part by weight" or "parts by weight" and "wt. %" unless otherwise specifically indicated.

I. EXAMPLES AND COMPARATIVE EXAMPLES OF PVA-BASE COPOLYMERS

Examples 1–4 & Comparative Example 1

In each Example, powder of PVA (polymerization degree: 550) having a saponification degree of 98.5 mole % and $\epsilon$-caprolactone were charged in proportions shown below in Table 1 together with tetrabutyl titanate as a catalyst in a reaction vessel and were thoroughly mixed there. The contents were then heated at a rate of 1° C./2–3 min with stirring under a nitrogen gas stream. When the temperature reached 150 to 160° C., the reaction mixture gradually turned to a homogeneous system from a heterogeneous system, and a perfect homogeneous system was formed at 180 to 200° C. They were reacted at 200 to 220° C. for 6 hours, whereby a PVA-base copolymer with an aliphatic polyester grafted thereon was obtained.

In the Comparative Example, the above PVA was used as was, and using a film prepared from its aqueous solution, physical properties were evaluated.

The respective copolymers so obtained and the PVA were evaluated by the following testing methods. The results are presented in Table 1.

(1) Number average molecular weight

Measured as a 5% solution in DMF by GPC. Each number average molecular weight is a number average molecular weight calibrated with standard polystyrene.

(2) Hardness

Using a sheet obtained by compression-forming the copolymer of each Example at 160° C., the hardness was measured by an A-type hardness meter in accordance with JIS K-6301.

(3) Strength characteristics

A No. 3 dumbbell specimen was prepared from the above-described compression-formed sheet, and was then measured in accordance with JIS K-7311.

(4) Vicat softening point

Measured in accordance with JIS K-7206.

TABLE 1

|  | Example 1 | Example 2 | Example 3 | Example 4 | Comparative Example 1 |
|---|---|---|---|---|---|
| Polyvinyl alcohol (parts) | 100 | 100 | 100 | 100 | 100 |
| $\epsilon$-Caprolactone (parts) | 30 | 70 | 100 | 150 | — |
| External appearance | Rubbery elastomer | Rubbery elastomer | Rubbery elastomer | Amorphous rubber | — |
| Number average molecular weight ($\times 10^4$) | App. 3.1 | App. 4.3 | App. 4.9 | — | — |
| Hardness (JIS-A) | 95 | 55 | 34 | — | — |
| 100% Modulus (MPa) | 7.4 | 2.5 | 0.7 | 0.05 | 48 |
| Tensile strength (MPa) | 45 | 32 | 12 | 0.3 | 56 |
| Elongation (%) | 320 | 460 | 720 | 1200 | 125 |
| Vicat softening point (°C.) | 108 | 64 | 41 | — | — |

II. EXAMPLES AND COMPARATIVE EXAMPLES DIRECTED TO GAS BARRIER COMPOSITIONS AND GAS BARRIER MATERIALS

Production Examples 1–3

In each Example, a PVA-base copolymer with an aliphatic polyester grafted thereon was obtained in a similar manner as in the Examples of I. except that powder of PVA (polymerization degree: 550) having a saponification degree of 98.5 mole % and $\epsilon$-caprolactone were used in proportions shown below in Table 2. Each copolymer so obtained was evaluated in the same manner as in the Examples of I. The results are presented in Table 2.

TABLE 2

|  | Production Example 1 | Production Example 2 | Production Example 3 |
|---|---|---|---|
| Polyvinyl alcohol (parts) | 100 | 100 | 100 |
| $\epsilon$-Caprolactone (parts) | 20 | 30 | 50 |
| External appearance | Rubbery elastomer | Rubbery elastomer | Rubbery elastomer |
| Number average molecular weight ($\times 10^4$) | App. 2.5 | App. 3.0 | App. 3.5 |
| Hardness (JIS-A) | 97 | 95 | 88 |
| 100% Modulus (MPa) | 9.8 | 7.4 | 5.4 |
| Tensile strength (MPa) | 51 | 45 | 38 |
| Elongation (%) | 210 | 320 | 410 |
| Vicat softening point (°C.) | 122 | 108 | 86 |

Examples 1–3

In each Example, the copolymer obtained in the corresponding Production Example was dried at 60° C. for 24 hours in a vacuum and the copolymer and an antioxidant were then mixed in a Brabender mixer, whereby a gas barrier composition according to the present invention was obtained.

The thus-obtained composition was formed at 210° C. by using a cast film extruder, whereby a film of 2 μm in thickness was obtained. The oxygen permeability of the film was measured using a gas transmission measuring instrument ("MOCON OXTRAN-10/50A", trade name; manufactured by Modern Controller Company). The results are presented in Table 3.

Examples 4–6

The films of Examples 1–3 were individually laminated on biaxially-stretched polypropylene films of 20 μm in thickness (product of Mitsubishi Chemical Corporation) and the oxygen permeabilities of the resulting laminates were measured in a similar manner as in Examples 1–3. Their oxygen permeabilities were not substantially different from the corresponding permeabilities measured in Examples 1–3.

Comparative Example 1

From an aqueous solution (concentration: 15%) of the PVA which was employed in the Production Examples and had the saponification of 98.5 mole %, a coating of 20 μm in thickness was obtained by a casting process. Its oxygen permeability was measured in a similar manner as in the Examples. The results are presented in Table 3.

Comparative Example 2

The oxygen permeability of a 20-μm thick film of an EVOH resin in which the proportion of copolymerized ethylene was 44 mole % (product of Kurarey Co., Ltd.) was measured in a similar manner as in the Examples. The results are presented in Table 3.

Comparative Example 3

The oxygen permeability of the biaxially-stretched polypropylene films employed in the Examples was measured. It is presented in Table 3.

TABLE 3

| | Oxygen permeability (cc/m² · day · atm) 23° C. | Flexibility* |
|---|---|---|
| Example 1 | 5.2 | A |
| Example 2 | 6.8 | A |
| Example 3 | 7.7 | A |
| Comp. Ex. 1 | 4.6 | C |
| Comp. Ex. 2 | 1.6 | B |
| Comp. Ex. 3 | 2500 | B |

*Flexibility was ranked based on conditions of each film after the film was bent 20 times.
A: No abnormality occurred.
B: Whitening and some cracks occurred.
C: Substantial cracks occurred.

III. EXAMPLES AND COMPARATIVE EXAMPLES DIRECTED TO HOT-MELT ADHESIVES

Examples 1–4

Hot-melt adhesives according to the present invention were obtained in a similar manner as in the Examples of I. except that the polyvinyl alcohol and ε-caprolactone were used in the proportions shown below in Table 4.

Comparative Example 1

The PVA itself, which was used in Example 1 and the saponification degree of 98.5% (polymerization degree: 550).

Comparative Example 2

One hundred parts of the PVA which was employed in Example 1 and had the saponification degree of 98.5% (polymerization degree: 550) and 25 parts of glycerin were molten and mixed at 170° C.

Various physical properties of the hot-melt adhesives in the above Examples and Comparative Examples are summarized below in Table 4.

TABLE 4

| | Example 1 | Example 2 | Example 3 | Example 4 | Comparative Example 1 | Comparative Example 2 |
|---|---|---|---|---|---|---|
| Polyvinyl alcohol (parts) | 100 | 100 | 100 | 100 | | |
| ε-Caprolactone (parts) | 50 | 70 | 100 | 150 | | |
| Physical properties | | | | | | |
| External appearance | Rubbery elastomer | Rubbery elastomer | Rubbery elastomer | Amorphous rubber | | |
| Number average molecular weight (×10⁴)*¹ | App. 3.5 | App. 4 | App. 5 | App. 6 | | |
| Hardness (JIS-A)*² | 87 | 55 | 34 | — | — | 97 |
| 100% Modulus (MPa)*³ | 5.4 | 2.5 | 0.7 | 0.05 | — | 9.5 |
| Tensile strength (MPa)*³ | 40 | 32 | 12 | 0.3 | — | 50 |
| Elongation (%)*³ | 380 | 460 | 720 | 1200 | — | 160 |
| Vicat softening point (°C.)*³ | 95 | 64 | 41 | 36 | — | 125 |
| Melt viscosity (mPa · s)*⁵ | | | | | | |
| 140° C. | 9600 | 6500 | 5200 | 3500 | Unable to measure | Unable to measure |
| 170° C. | 4200 | 3000 | 2000 | 1300 | Unable to measure | Unable to measure |
| Flexibility*⁶ | A | A | A | A | C | C |

TABLE 4-continued

|  | Example 1 | Example 2 | Example 3 | Example 4 | Comparative Example 1 | Comparative Example 2 |
|---|---|---|---|---|---|---|
| Adhesiveness*[7] | 0.56 (Torn) | 0.53 (Torn) | 0.45 (Torn) | 0.41 (Torn) | — | 0.48 (Torn) |

(Note) Torn: the material was torn.
Testing methods: The tests of the various physical properties in Table 4 were conducted by the following methods.
*[1]) Molecular weight: Value measured as an N,N-dimethylformamide solution (5%) by GPC.
*[2]) Hardness: A sheet, which had been obtained by compression-forming at 160° C. the resin obtained in each of Examples 1–4, was measured by an A-type hardness meter on the basis of JIS K-6301. Incidentally, it was impossible to press-form the PVAs of the Comparative Examples.
*[3]) 100% Modulus (MPa, tensile strength (MPa), elongation (%): A sheet, which had been obtained by compression-forming the resin obtained in each of Examples 1–4, was punched out by a No. 3 dumbbell prescribed in JIS K-7311 and its physical properties were measured. Concerning the PVA of each Comparative Example, on the other hand, a sheet obtained by casting its aqueous solution was likewise punched out by a No. 3 dumbbell and its physical properties were measured.
*[4]) Vicat softening point: The softening point of each resin was measured in accordance with JIS K-7206.
*[5]) Melt viscosity: Following JAI-7-1991, melt viscosities at 140° C. and 170° C. were measured by a Brookfield rotational viscometer at a revolution speed of 1,000 rpm, while using Spindle No. 29.
*[6]) Flexibility: A sheet of 1 mm in thickness was prepared. After the sheet was left over at −10° C. for 1 hour, the sheet. was bent and the bent portion was then observed for its conditions. A: No change. B: Whitened at the bent portion. C: Cracked.
*[7]) Adhesiveness: A melt obtained from each resin composition was caused to flow in the form of a strand from a feeder onto a steel belt, so that the melt was codied and solidified. The thus-solidified strand was formed by a cutter into a square shape of 20 mm in length, 20 mm in width and 3 mm in thickness, whereby a hot-melt adhesive was obtained. Next, the hot-melt adhesive was heated and molten. A wood-free paper was placed on a coated surface. The resulting sub-assembly was fed between hot rollers of about 150° C. to obtain a bonded paper. After the bonded paper was left over at 23° C. and 65% RH for 24 hours, its 180 peeling strength was measured under the same conditions.

Testing Methods

The tests of the various physical properties in Table 4 were conducted by the following methods.

1) Molecular weight

Value measured as an N,N-dimethylformamide solution (5%) by GPC.

2) Hardness

A sheet, which had been obtained by compression-forming at 160° C. the resin obtained in each of Examples 1–4, was measured by an A-type hardness meter on the basis of JIS K-6301. Incidentally, it was impossible to press-form the PVAs of the Comparative Examples.

3) 100% Modulus (MPa), tensile strength (MPa), elongation (%)

A sheet, which had been obtained by compression-forming the resin obtained in each of Examples 1–4, was punched out by a No. 3 dumbbell prescribed in JIS K-7311 and its physical properties were measured.

Concerning the PVA of each Comparative Example, on the other hand, a sheet obtained by casting its aqueous solution was likewise punched out by a No. 3 dumbbell and its physical properties were measured.

4) Vicat softening point

The softening point of each resin was measured in accordance with JIS K-7206.

5) Melt viscosity

Following JAI-7-1991, melt viscosities at 140° C. and 170° C. were measured by a Brookfield rotational viscometer at a revolution speed of 1,000 rpm while using Spindle No. 29.

6) Flexibility

A sheet of 1 mm in thickness was prepared. After the sheet was left over at −10° C. for 1 hour, the sheet was bent and the bent portion was then observed for its conditions.

A: No change.
B: Whitened at the bent portion.
C: Cracked.

7) Adhesiveness

A melt obtained from each resin composition was caused to flow in the form of a strand from a feeder onto a steel belt, so that the melt was cooled and solidified. The thus-solidified strand was formed by a cutter into a square shape of 20 mm in length, 20 mm in width and 3 mm in thickness, whereby a hot-melt adhesive was obtained.

Next, the hot-melt adhesive was heated and molten. A wood-free paper was placed on a coated surface. The resulting sub-assembly was fed between hot rollers of about 150° C. to obtain a bonded paper. After the bonded paper was left over at 23° C. and 65% RH for 24 hours, its 180° peeling strength was measured under the same conditions.

IV. EXAMPLE & COMPARATIVE EXAMPLES DIRECTED TO RELEASE TREATMENTS

Production Examples 1–3

In each Example, the PVA, whose saponification degree was 98.5% (polymerization degree: 550), ε-caprolactone and tetrabutyl titanate were charged in a reaction vessel and in a similar manner as in the Examples of I., a resin having the physical properties shown below in Table 5 and useful for the preparation of a release treatment according to the present invention was obtained.

TABLE 5

|  | Production Example 1 | Production Example 2 | Production Example 3 |
|---|---|---|---|
| Polyvinyl alcohol (parts) | 100 | 100 | 100 |
| ε-Caprolactone (parts) | 20 | 30 | 50 |
| Physical properties |  |  |  |
| External appearance | Rubbery elastomer | Rubbery elastomer | Rubbery elastomer |
| Number average molecular weight *[1] | App. 2.5 | App. 3 | App. 3.5 |

TABLE 5-continued

|  | Production Example 1 | Production Example 2 | Production Example 3 |
|---|---|---|---|
| (×10⁴) |  |  |  |
| Hardness (JIS-A)*² | 97 | 95 | 88 |
| 100% Modulus (MPa)*³ | 9.8 | 7.4 | 5.4 |
| Tensile strength (MPa)*³ | 51 | 45 | 38 |
| Elongation (%)*³ | 210 | 320 | 410 |
| Vicat softening point (°C.)*⁴ | 122 | 108 | 86 |

[Testing methods] The tests were conducted in the same manner as described above.

Example 1

Thirty parts of the resin of Production Example 1 were dispersed in 60 parts of xylene, followed by the addition of 166 parts of stearyl isocyanate at reflux temperature. As the reaction proceeded, the reaction mixture progressively turned into a homogeneous system. After the reaction mixture eventually became a perfect homogeneous system, the reaction was allowed to proceed further for 1 hour. Subsequent to cooling, the reaction mixture was poured into 3 volumes of methanol so that a white precipitate was obtained. The white precipitate was washed, dried and then ground, whereby a target release treatment was obtained.

Example 2

A reaction was conducted in a similar manner as in Example 1 except for the use of 30 parts of the resin of Production Example 2 and 185 parts of docosanyl isocyanate, whereby a target release treatment was obtained.

Example 3

A reaction was conducted in a similar manner as in Example 1 except for the use of 40 parts of the resin of Production Example 3 and 200 parts of hexaconyl isocyanate, whereby a target release treatment was obtained.

Comparative Example 1

A reaction was conducted in a similar manner as in Example 1 except for the use of 25 parts of the PVA (saponification degree: 98.5%, polymerization degree 550), 50 parts of xylene and 166 parts of stearyl isocyanate, whereby a release treatment was obtained.

Comparative Example 2

A reaction was conducted in a similar manner as in Example 1 except for the use of 25 parts of the PVA (saponification degree: 98.5%, polymerization degree 550), 50 parts of xylene and 200 parts of docosanyl isocyanate, whereby a release treatment was obtained.

Peeling Force Test

The release treatments obtained in the above-described Examples and Comparative Examples were each dissolved in toluene to a concentration of 2%. The 2% toluene solution was coated on a corona-discharge-treated side of an OPP film and also on an untreated side of a PET film to give a dry coat weight of 0.1 g/m².

Rubber-base self-adhesive tapes (product of Nichiban Co., Ltd.) and acrylic self-adhesive tapes (product of Sekisui Chemical Co., Ltd.), which are of 25 mm in width, were compression-bonded to the above-prepared release films, respectively, by a rubber roller whose own weight was 2 kg. After stored for 24 hours at room temperature (20° C. humidity: 52%) and for 24 hours at a high temperature (50° C.), they were left over for 2 hours at room temperature and peeling forces were then measured.

Separation Tendency Test

After a gauze was reciprocated 10 times under a load of 50 g/cm² on and along each release-treated layer, the adhesion of the release-treated layer to a base material was observed.

A: No changes.

B: Localized separation was observed.

C: Separated.

Adhesion Test

One hundred squares of 1 cm×1 cm were cut in each coating by a knife, and a peeling test was conducted using an adhesive cellophane tape.

Storability Test

Portions of each 2% toluene solution were stored for 3 days at 5° C. and 23° C. respectively. They were then observed for changes.

TABLE 6

| | | Peeling Force (g/inch) | | | | | | | | | | | |
|---|---|---|---|---|---|---|---|---|---|---|---|---|---|
| | | Untreted | | Example 1 | | Example 2 | | Example 3 | | Comparative Example 1 | | Comparative Example 2 | |
| | | OPP | PET | OPP | PET | OPP | PET | OPP | PET | OPP | PET | OPP | PET |
| Acrylic | 20° C. | 610 | 520 | 70 | 45 | 30 | 25 | 35 | 25 | 45 | 50 | 30 | 25 |
| self-adhesive tape | 50° C. | 660 | 540 | 70 | 50 | 30 | 35 | 40 | 35 | 50 | 60 | 35 | 40 |
| Rubber-base | 20° C. | 460 | 380 | 200 | 130 | 250 | 180 | 260 | 195 | 300 | 200 | 230 | 185 |
| self-adhesive tape | 50° C. | 560 | 350 | 200 | 160 | 270 | 200 | 280 | 210 | 320 | 240 | 240 | 200 |
| Separation tendency | | | | A | A | A | A | A | A | B | B | C | C |
| Adhesion (number of remaining squares) | | | | 100 | 100 | 100 | 100 | 100 | 100 | 50 | 50 | 50 | 50 |
| | | | | 100 | 100 | 100 | 100 | 100 | 100 | 100 | 100 | 100 | 100 |

TABLE 6-continued

Peeling Force (g/inch)

|  |  | Untreted | | Example 1 | | Example 2 | | Example 3 | | Comparative Example 1 | | Comparative Example 2 | |
| --- | --- | --- | --- | --- | --- | --- | --- | --- | --- | --- | --- | --- | --- |
|  |  | OPP | PET | OPP | PET | OPP | PET | OPP | PET | OPP | PET | OPP | PET |
| Storability | 5° C. |  |  | No change | | No change | | No change | | Deposited | | Deposited | |
|  | 23° C. |  |  | No change | | No change | | No change | | No change | | No change | |

V. EXAMPLES AND COMPARATIVE EXAMPLES DIRECTED TO COATING COMPOSITIONS FOR FORMED PRODUCTS OF PLASTICIZED VINYL CHLORIDE RESIN AND FORMED PRODUCT OF PLASTICIZED VINYL CHLORIDE RESIN COATED BY THE COMPOSITIONS

Production Examples 1–3

In each Example, a PVA-base copolymer with an aliphatic polyester grafted thereon was obtained in a similar manner as in the Examples of I. except that powder of PVA (polymerization degree: 550) having a saponification degree of 98.5 mole % and $\epsilon$-caprolactone were used. Each copolymer so obtained was evaluated in the same manner as described above. The results are presented in Table 7.

TABLE 7

|  | Production Example 1 | Production Example 2 | Production Example 3 |
| --- | --- | --- | --- |
| Polyvinyl alcohol (parts) | 100 | 100 | 100 |
| $\epsilon$-Caprolactone (parts) | 20 | 30 | 50 |
| External appearance | Rubbery elastomer | Rubbery elastomer | Rubbery elastomer |
| Number average molecular weight ($\times 10^4$) | App. 2.5 | App. 3.0 | App. 3.5 |
| Hardness (JIS-A) | 97 | 95 | 88 |
| 100% Modulus (MPa) | 9.8 | 7.4 | 5.4 |
| Tensile strength (MPa) | 51 | 45 | 38 |
| Elongation (%) | 210 | 320 | 410 |
| Vicat softening point (°C.) | 122 | 108 | 86 |

Examples 1–3

The copolymers, which had been obtained in Production Examples –3, were separately dissolved in a 3:7 mixed solvent of isopropyl alcohol and water, whereby coating compositions according to the present invention were obtained with a solid content of 20%.

A soft vinyl chloride resin sheet (thickness: 3 mm) were coated on both sides thereof with one of the above-prepared coating compositions by a bar coater to give a dry thickness of 10 to 20 $\mu$m. The thus-coated sheet was dried at 80° C. for 30 seconds. Coated soft vinyl chloride resin sheets obtained as described above were tested by the following testing methods. The results are presented in Table 8.

(1) Bled-out Amount of Plasticizer

Each double-side coated soft vinyl chloride sheet was cut into 50 mm×50 mm. It was sandwiched between polyethylene sheets whose total weight had been measured in advance, followed by placement between glass plates. The thus-obtained assembly was left over under a load of 5 kg for 24 hours in a constant-temperature chamber which was controlled at 70° C. The assembly was taken out of the constant temperature chamber, and the total weight of the polyethylene sheets was then measured to determine a weight increase. This weight increase was recorded as the amount of the bled-out plasticizer.

(2) Anti-staining Properties

Each double-side coated soft vinyl chloride sheet was cut into 50 mm×50 mm, and was then brought into a contiguous relationship with a copying paper which had been light-sensitized beforehand. They were sandwiched between glass plates. Assemblies which had been obtained as described above were left over under a load of 3 kg for 24 hours and 72 hours, respectively, in a constant-temperature chamber which was controlled at 50° C. Each sheet was peeled off from its corresponding copying paper and was visually observed for the degree of stain.

A: No stain.

B: Localized stain.

C: The sheet was stained over the entire area thereof.

(3) Adhesion

One hundred squares of 1 cm×1 cm were cut in each coating by a knife, and a peeling test was conducted using an adhesive cellophane tape.

(4) Softness and Flexibility

Each double-side coated soft vinyl chloride sheet was bent 20 times at room temperature, and each coating were visually observed for its conditions.

A: No change.

B: Whitened.

C: Cracked.

(5) Waterproofness

Each double-side coated soft vinyl chloride sheet was immersed for 1 day in water. Immediately after it was taken out of the water and also subsequent to its drying at room temperature, each coating was visually observed for its conditions.

A: Immediately after the sheet was taken out of the water, the coating was slightly cloudy but blister or the like was not observed. After the drying, no difference was observed from the conditions before the immersion.

B: Cloudiness or blister was observed immediately after the sheet was taken out of the water but after the drying, no difference was observed from the conditions before the immersion.

C: Substantial cloudiness and blister were observed immediately after the sheet was taken out of the water and even after the drying, the coatings did not return to the pre-immersion conditions.

(6) Solvent resistance

Each double-side coated soft vinyl chloride sheet was rubbed 20 strokes under a load of 500 g with a cloth soaked with toluene and white gasoline. The coating was visually observed for its conditions.

Comparative Example 4

In a similar manner as in Examples 1–3, a soft vinyl chloride resin sheet was coated with a coating composition composed of a PVC-coating fluorinated resin ("FLUOROTOP", trade name; product of Asahi Glass Co., Ltd.) and a curing agent ("Colonate HX", trade name; product of Nippon Polyurethane Industry Co., Ltd.) added thereto. Test results are presented in Table 8.

TABLE 8

|  | Example | | | | | | Comparative Example | | | |
|---|---|---|---|---|---|---|---|---|---|---|
|  | 1 | 2 | 3 | 4 | 5 | 6 | 1 | 2 | 3 | 4 |
| Bled-out amount of plasticizer (mg) | 2.8 | 5.4 | 8.2 | 1.3 | 3.5 | 6.8 | 40.2 | 1.8 | 35.3 | 28.8 |
| Anti-staining properties | | | | | | | | | | |
| 24 hours | A | A | A | A | A | A | C | A | C | B |
| 72 hours | A | A | A | A | A | A | C | A | C | C |
| Adhesion | 100 | 100 | 100 | 100 | 100 | 100 | — | 0 | 100 | 100 |
|  | 100 | 100 | 100 | 100 | 100 | 100 |  | 100 | 100 | 100 |
| Softness and flexibility | A | A | A | B | A | A | — | C | A | A |
| Waterproofness | B | B | A | A | A | A | — | C | A | A |
| Solvent resistance | | | | | | | | | | |
| Toluene | A | A | A | A | A | A | — | A | C | A |
| White gasoline | A | A | A | A | A | A | — | A | B | A |

A: No change.

B: Localized trace of rubbing.

C: Trace of rubbing and separation of the coating.

Examples 4–6

Tests were conducted on soft vinyl chloride resin sheets coated with crosslinked coatings of PVA-base copolymers. The results will be presented below.

Soft vinyl chloride resin sheets were coated in a similar manner as in Examples 1–3 except that a self-emulsifiable polyisocyanate (product of Nippon Polyurethane Industry Co., Ltd.) was added to the coating compositions employed in Examples 1–3. The thus-coated sheets were tested in a similar manner as in Examples 1–3. The results are presented in Table 8.

Comparative Example 1

The soft vinyl chloride resin sheet was tested without formation of any coating of any coating composition thereon. The test results are presented in Table 8.

Comparative Example 2

A soft vinyl chloride resin sheet was applied with a coating of PVA whose saponification degree was 98.5 mole %. Test results are presented in Table 8.

Comparative Example 3

In a similar manner as in Examples 1–3, a soft vinyl chloride resin sheet was coated with a solution of a coating composition composed of an acrylic resin ("Acryl Polyol LR-620", trade name; product of Mitsubishi Rayon Co., Ltd.) and a curing (crosslinking) agent ("Colonate HX", trade name; product of Nippon Polyurethane Industry Co., Ltd.) added thereto. Test results are presented in Table 8.

Example 7–9

The copolymers obtained in Production Examples 1–3 were separately dried at 60° C. for 24 hours in a vacuum. The copolymers so dried were individually mixed with an antioxidant under heat in a Brabender mixer, whereby coating compositions according to the present invention were prepared.

Each coating composition was formed at 210° C. by a film-forming machine, so that a film of 20 $\mu$m in thickness was obtained. A soft vinyl chloride sheet and the film were laminated together by a thermal lamination method. Laminates obtained as described above were tested in a similar manner as in Examples 1–3. The test results were similar to those obtained in Examples 1–3.

VI. EXAMPLES AND COMPARATIVE EXAMPLES DIRECTED TO INK JET RECORDING SHEETS

Referential Examples 1–4

In each of the Referential Examples, powder of PVA whose saponification degree was 98.5% (polymerization degree: 550) and $\epsilon$-caprolactone were charged in a reaction vessel. Following the procedures of the Examples of I., a PVA-base copolymer according to the present invention was obtained. Together with proportions of the PVA and $\epsilon$-caprolactone, properties of each PVA-base copolymer so obtained are presented in Table 9.

Comparative Referential Example

Using only the PVA of the Referential Examples (saponification degree: 98.5%, polymerization degree: 550), a film was cast from its aqueous solution. Its physical properties were evaluated.

The above results are presented in Table 9.

TABLE 9

|  | Referential Example 1 | Referential Example 2 | Referential Example 3 | Referential Example 4 | Comp. Ref. Example |
|---|---|---|---|---|---|
| Polyvinyl alcohol (parts) | 100 | 100 | 100 | 100 | 100 |
| ε-Caprolactone (parts) | 30 | 70 | 100 | 150 | — |
| External appearance | Rubbery elastomer | Rubbery elastomer | Rubbery elastomer | Amorphous rubber | — |
| Number average molecular weight ($\times 10^4$) | App. 3 | App. 4 | App. 5. | App. 6 | — |
| Hardness (JIS-A) | 95 | 55 | 34 | — | — |
| 100% Modulus (MPa) | 7.4 | 2.5 | 0.7 | 0.05 | 48 |
| Tensile strength (MPa) | 45. | 32 | 12 | 0.3 | 56 |
| Elongation (%) | 326 | 460 | 720 | 1200 | 125 |
| Vicat softening point (°C.) | 108 | 64 | 41 | — | — |

[Testing methods] The tests were conducted in the same monomer as described above.

Examples 1–4

Forty parts of the resin obtained in each Referential Example, 100 parts of fine particular synthetic amorphous silica (BET specific surface area: 300 m$^2$/g, product of Mizusawa Industrial Chemicals, Ltd.) and 0.2 part of a dispersant [poly(sodium pyrophosphate)] were dispersed and mixed in a mixed solvent of water and ethyl alcohol, whereby a coating formulation having a solid content of 15% was obtained.

Each coating formulation was coated on a wood-free paper of 35 g/m$^2$ in basis weight by an air knife coater to give a coat weight of 10 g/m$^2$ (dry basis), so that an ink-receiving layer was formed. After drying, the coated sheet was finished under a linear pressure of 200 kg/cm by a super calender.

Comparative Example 1

An ink-receiving layer was formed in a similar manner as in Examples 1–4 except that the PVA employed in Referential Examples 1–4 and having the saponification degree of 98.5% (polymerization degree: 550) was used.

Comparative Example 2

An ink-receiving layer was formed in a similar manner as in Examples 1–4 except for the use of polyvinylpyrrolidone (molecular weight: 360,000; product of BASF AG).

With respect to the six types of sheets with the ink-receiving layers formed as described above, printing (i.e. recording) was conducted using four colors of yellow, magenta, cyan and black. The printing was performed by an ink jet printer which was designed to perform printing with inks of water-soluble dyes. The sheets were ranged concerning the below-described properties. The results are presented in Table 10.

Ink Absorbency

Time until the printed inks were dried was measured in terms of seconds.

A: 5 seconds or shorter.
B: 6 to 10 seconds.
C: 11 seconds or longer.

Density Irregularity

A 50% halftone pattern was printed with a cyan-color ink and the image so obtained was visually observed.

A: Occurrence of no density irregularity.
B: Occurrence of some density irregularity.
C: Occurrence of density irregularity.

Vividness of Produced Colors

After a color image was printed by the above printer, the vividness of colors in the resultant color image was visually observed.

A: High
B: Average
C: Low

Bleeding

The extent of bleeding and running of inks in a boundary area between overlap-printed magenta and cyan was visually observed.

A: Good
B: Average
C: Poor

Strength of Coating Layer

Each recording sheet was bent 10 times and its coating layer was observed for conditions such as peeling and cracking.

A: No change
B: Slight change
C: Occurrence of peeling and cracking

Waterproofnesss of Ink-Receiving Layer

Each ink-receiving layer was immersed in water and water was then wiped off under a constant finger pressure. The extent of peeling of the ink-receiving layer at that time was ranked.

A: No change
B: Slight change
C: Peeled

Waterproofness of Printed Image

After printing by the printer, each recording sheet was immersed for 10 minutes in water. It was then dried at room temperature. The recorded image was then visually observed for changes in bleeding and developed colors.

A: No change
B: Slight color changes
C: Substantial color changes

TABLE 10

|  | Example 1 | Example 2 | Example 3 | Example 4 | Comparative Example 1 | Comparative Example 2 |
| --- | --- | --- | --- | --- | --- | --- |
| Ink absorbency | A | A | B | C | A | A |
| Density irregularity | B | A | A | A | B | B |
| Vividness of produced colors | A | A | A | A | A | A |
| Bleeding | A | A | A | A | C | C |
| Strength of coated layer | A | A | A | A | C | C |
| Waterproovenss of ink-receiving layer | B | A | A | A | C | C |
| Waterproovenss of printed image | B | A | A | A | C | C |

We claim:

1. A printed sheet, comprising:

a base material sheet;

at least one ink-receiving layer on at least one side of said base material sheet which comprises a polyvinyl alcohol-base copolymer, wherein said polyvinyl alcohol-base copolymer is obtained by subjecting a lactone, whose ring is formed of 3 to 10 carbon atoms, to ring-opening polymerization in the presence of polyvinyl alcohol, said copolymer comprising a polyvinyl alcohol chain and an aliphatic polyester grafted in a ring-opened polymer of said lactone on said polyvinyl alcohol chain, and said copolymer having a polyvinyl alcohol content of 2 to 98 wt. %, a polyester content of 98 to 2 wt. %, and a number average molecular weight of 10,000 to 500,000, wherein said at least one ink-receiving layer is printed on with an ink.

2. The printed sheet of claim 1, wherein said base material sheet comprises a paper.

3. The printed sheet of claim 1, wherein said base material sheet comprises a plastic film.

4. The printed sheet of claim 1, wherein said base material sheet comprises a glass.

5. The printed sheet of claim 1, wherein said base material sheet comprises a polyester, a polyamide, cellulose triacetate, a polycarbonate, polyvinyl chloride, polyethylene, polypropylene, polystyrene or polymethyl methacrylate.

6. The printed sheet of claim 1, which has a thickness of 50 to 250 $\mu$m.

7. An printed sheet according to claim 1, wherein said polyvinyl alcohol copolymer comprises 95 to 30 wt. % of said polyvinyl alcohol 5 to 70 wt. % of said aliphatic polyester.

8. The printed sheet of claim 1, wherein said polyvinyl alcohol has a saponification degree of at lest 60 mol %.

9. The printed sheet of claim 1, wherein said aliphatic polyester is a ring-open polymer of a $\delta$-valerolactone and/or an $\epsilon$-caprolactone.

10. The printed sheet of claim 1, wherein said polyvinyl alcohol-based copolymer comprises 60 to 98 wt. % of said polyvinyl alcohol and 40 to 2 wt. % of said aliphatic polyester.

* * * * *